(12) United States Patent
Hale

(10) Patent No.: US 8,710,792 B2
(45) Date of Patent: Apr. 29, 2014

(54) AIR DRIVEN ALTERNATORS FOR BATTERY POWERED VEHICLES

(76) Inventor: James L. Hale, Fort Wayne, IN (US)

( * ) Notice: Subject to any disclaimer, the term of this patent is extended or adjusted under 35 U.S.C. 154(b) by 0 days.

(21) Appl. No.: 13/506,777

(22) Filed: May 17, 2012

(65) Prior Publication Data

US 2013/0307465 A1     Nov. 21, 2013

(51) Int. Cl.
*H02J 7/00* (2006.01)
(52) U.S. Cl.
USPC ............ 320/101; 320/104; 320/107; 903/903
(58) Field of Classification Search
USPC ............. 320/101, 104, 107; 180/2.2; 903/903
See application file for complete search history.

(56) References Cited

U.S. PATENT DOCUMENTS

| | | | | |
|---|---|---|---|---|
| 3,878,913 A | * | 4/1975 | Lionts et al. ................... | 180/2.2 |
| 4,254,843 A | * | 3/1981 | Han et al. ...................... | 180/165 |
| 6,897,575 B1 | * | 5/2005 | Yu ................................... | 290/44 |
| 2006/0273596 A1 | * | 12/2006 | Durbin .......................... | 290/54 |

* cited by examiner

*Primary Examiner* — Edward Tso
*Assistant Examiner* — Aaron Piggush

(57) ABSTRACT

The mechanism recharges the batteries of electric powered vehicles while the vehicle is in motion. As a vehicle moves forward it creates an air flow that enters the air scoop of the mechanism. The air flow passes through the air reduction tunnel and turns the wind blades of the mechanism which turns a drive shaft. The drive shaft has two gears, one turns a governor, the other turns an alternator that creates electric current that passes through a voltage regulator and on to the batteries that drive the vehicles motor. Air velocity entering the mechanism varies by the forward speed of the vehicle. A governor maintains the desired rpms of the drive shaft by changing the pitch (angle) of the variable pitch wind blades. A drain hole is located in the bottom of the base for moisture taken in through the scoop.

2 Claims, 4 Drawing Sheets

Hub Detail

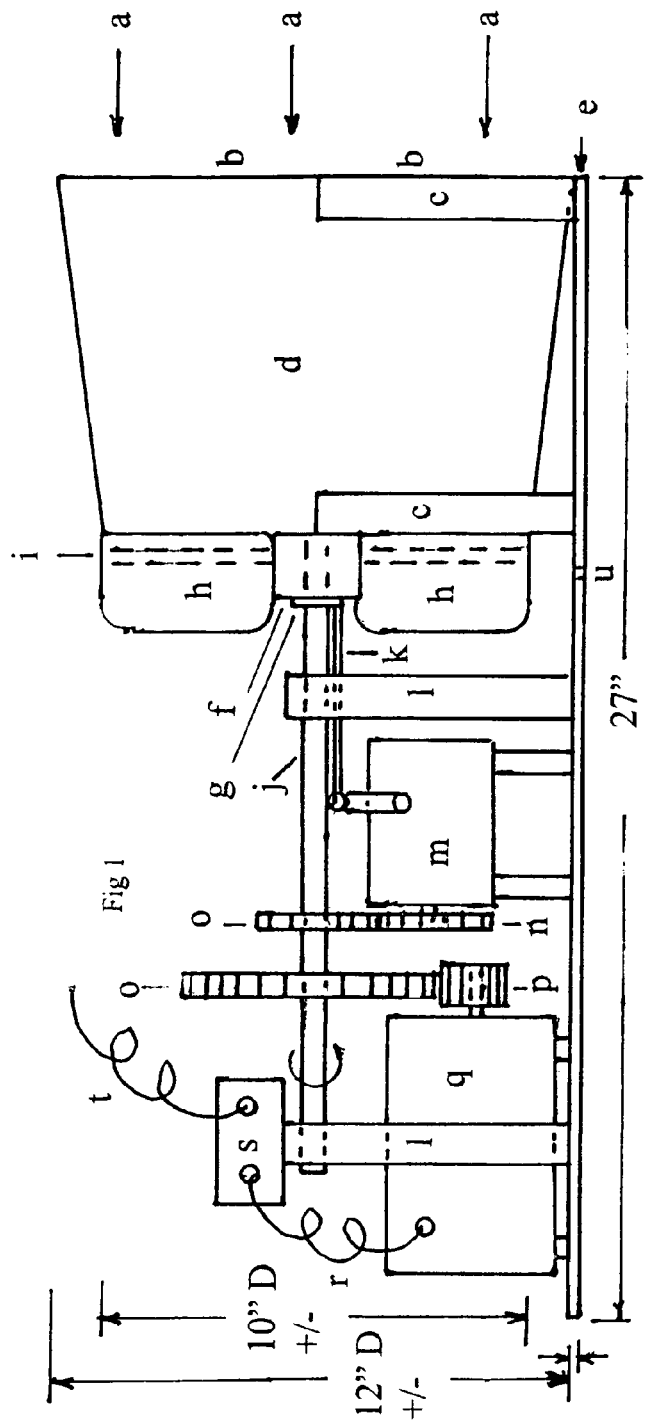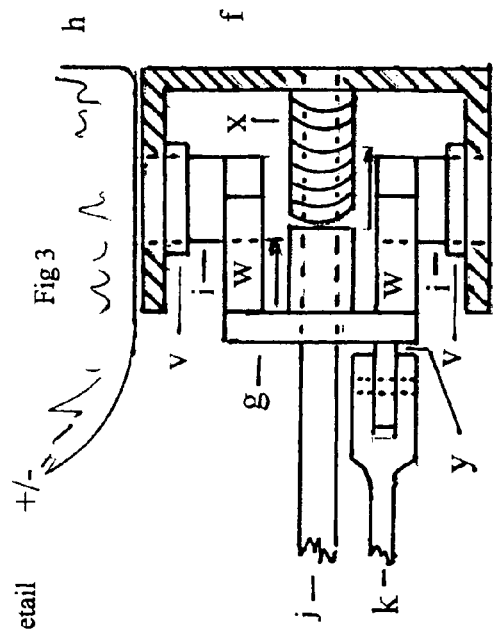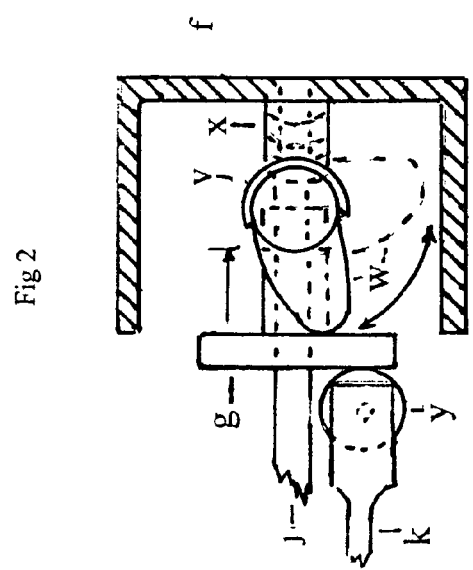

Enlarged to show detail

Enlarged to show detail

Enlarged to show detail

AIR DRIVEN ALTERNATORS FOR BATTERY POWERED VEHICLES

A forward moving vehicle creates air flow. A better understanding of how the invention converts air flow into electricity for an electric powered vehicle will be obtained from the following brief description in the submitted drawings:

FIG. 1 is a side view of the invention showing how the mechanism generates electricity.

FIG. 2 is a detail top view of the hub assembly that changes the pitch of the wind blades.

FIG. 3 is a side view of the hub assembly shown in FIG. 2.

Figure 4:
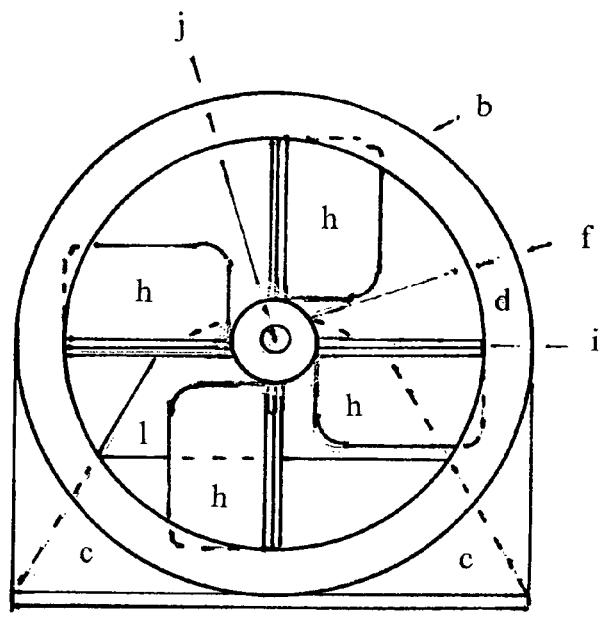
FIG. 4 is a front view of the mechanism shown in FIG. 1.

Referring more particularly now to FIGS. 1 through 13 there is shown the parts that compose the mechanism and how they operate to covert air flow into electricity to charge the batteries of electric powered vehicles.

FIG. 1 shows air flow (a) entering the mechanism through an air scoop (b) and passes on through a reduction tunnel (d), coming into contact with wind blades (h). The wind blades (h) are attached to wind blade rods (i) that allow the wind blades (h) to change pitch approximately 30 degrees, from maximum thrust position to 0 degrees. Four wind blades (h) are used for illustration in these drawings, but any other number may be used. The wind blades (h) rotate a drive shaft (j) which turns two gears (o). One gear meshes with a governor gear (n), while the other turns an alternator gear (p). The governor gear (n) rotates the governor (m) which is set to maintain the desired rpms for the drive shaft (j). The governor control rod (k) and the governor control rod wheel (y) moves a pitch control ring with sleeve (g) to change the pitch (angle) of the wind blades (h) thereby maintaining the desired rpms of the drive shaft (j). The alternator gear (p) turns the alternator (q) creating electricity that passes through a wire (r) to a voltage regulator (s) and on through another wire (t) to the batteries that power the vehicles motor.

Pulleys and belts may replace gears shown.

FIG. 2 shows a top view of the hub (f) assembly. For clarity, the wind blades (h) are not shown. FIG. 2 shows the governor control rod (k), the governor control rod wheel (y) that moves forward against the pitch control ring with sleeve (g) coming into contact with a cam (w). Also shown is the return spring (x). FIG. 2 shows the longitudinal movement range of the pitch control ring with sleeve (g).

FIG. 3 shows a side view of the hub (f) assembly. It shows the drive shaft (j) rotating and turning the pitch control ring with sleeve (g). It also shows the governor control rod (k), the governor control rod wheel (y) that moves the pitch control ring with sleeve (g), coming into contact with a cam (w) that is attached to and turns the wind blade rod (i) and the wind blades (h) to a different pitch (angle). When the rpms are reduced by this change in pitch a return spring (x) maintains contact between the cam (w) and the inner face of the pitch control ring with sleeve (g).

Air flow velocity entering the air scoop (b) shown in FIG. 1 will vary by the forward speed of the vehicle. At highway speeds of 65 mph to 70 mph, the pitch of the wind blades (h) will be opened by the governor (m), the governor control rod (k), the governor control rod wheel (y), the pitch control ring with sleeve (g) and a cam (w) attached to the wind blade rod (i) thereby decreasing the rpms of the drive shaft (j) to the desired rate. At city speeds of 30 mph to 35 mph, the governor (m) linkage described above will retract allowing the return spring (x) to rotate the wind blade rods (i) and the wind blades (h) to the best pitch angle for the slower vehicle speeds.

FIG. 4 shows a front view of the mechanism with the air scoop (b), the reduction tunnel (d), the four wind blades (h), the unit supports (c), a partial view of a bracket (l) visible and the base (e).

Figure 5:
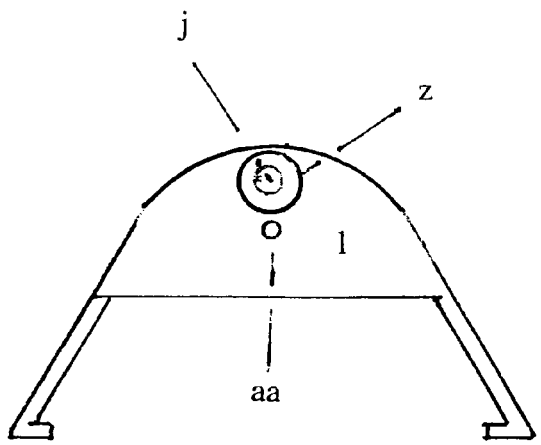
FIG. 5 is a front view of the brackets that hold the mechanism in place and supports the drive shaft.

FIG. 5 shows a front view of the bracket (l). There are two such brackets in the mechanism. The front bracket (l) only has a bushing (aa) through which the governor control rod (k) is supported. Both brackets (l) have ball bearing rings (z) that provide low friction support for the drive shaft (j).

Figure 6:
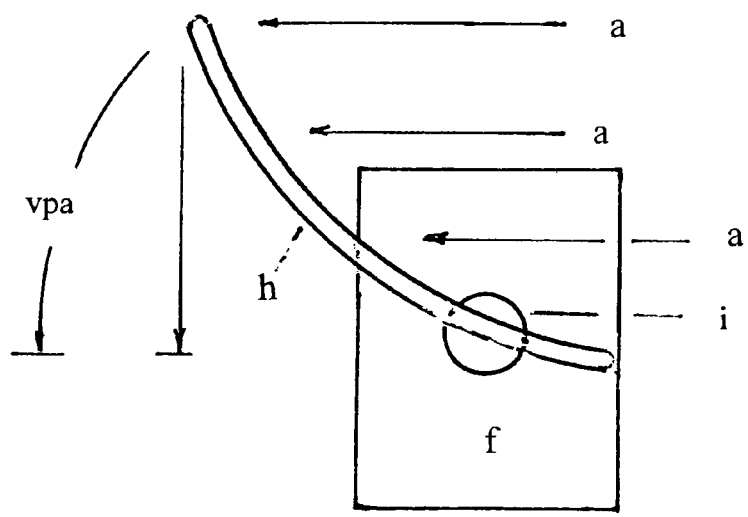
FIG. 6 is a top view of a wind blade, the hub and the wind blade rod.

FIG. 6 shows a top view configuration of a wind blade (h), the hub (f) and the wind blade rod (i). Changes in the pitch of the wind blades (h) is exhibited by line (vpa). The optimum configuration of the wind blades (h) can best be determined by wind tunnel tests.

Figure 7:
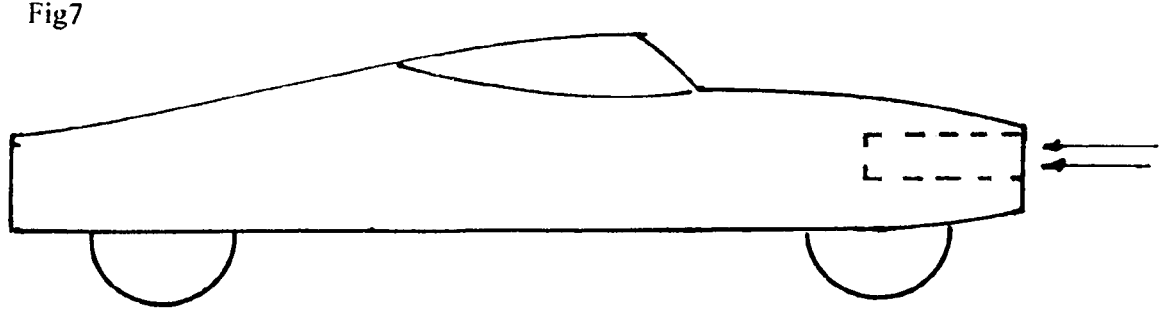
FIG. 7 is a side view of the mechanism mounted in a forward position on a vehicle.

FIG. 7 shows a side view of a mechanism mounted in a forward position of a vehicle. Only one mechanism can be seen from this view.

Figure 8:
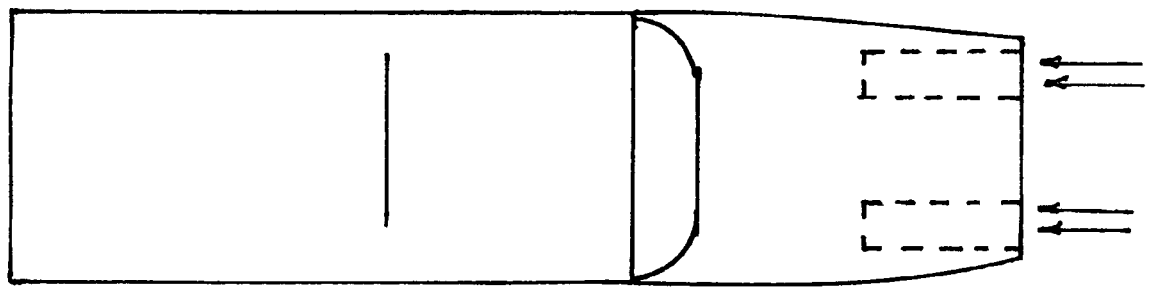
FIG. 8 is a top view of the mechanism shown in FIG. 7.

FIG. 8 shows a top view of two mechanisms mounted in a forward position in a vehicle.

Figure 9:
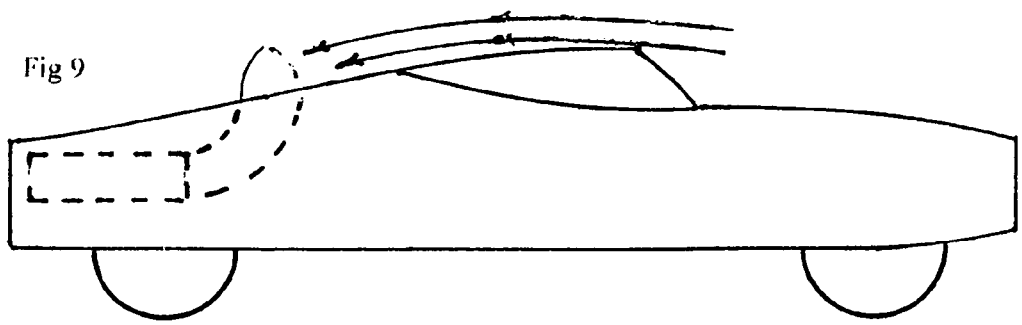
FIG. 9 is a side view of the mechanism mounted in a rear position on a vehicle.

FIG. 9 shows a side view of a mechanism mounted in a rear position of a vehicle. It also shows an exterior hinged air scoop that diverts air flow down to the mechanism. The exterior hinged air scoop can be electronically programmed to open at approximately 30 mph and closed at vehicle speeds of less than 30 mph. The opening and closing of the exterior hinged air scoops can best be determined by wind tunnel tests.

Figure 10:
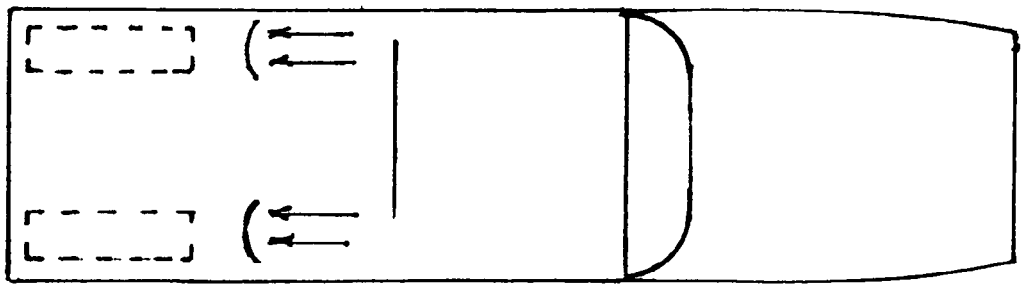
FIG. 10 is a top view of the mechanism shown in FIG. 9.

FIG. 10 shows a top view of two mechanisms mounted in a rear position of a vehicle.

Figure 11:
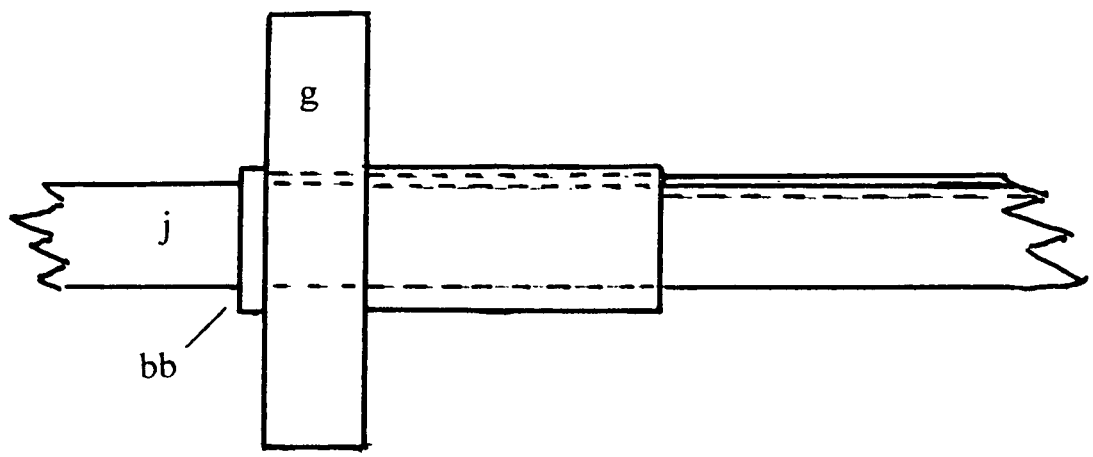
FIG. 11 is a side view of the pitch control ring with sleeve set on the drive shaft with the travel stop.

FIG. 11 shows a side view of the drive shaft (j), pitch control ring with sleeve (g) and the stop (bb) which limits the longitudinal travel of the pitch control ring with sleeve (g).

Figure 12:
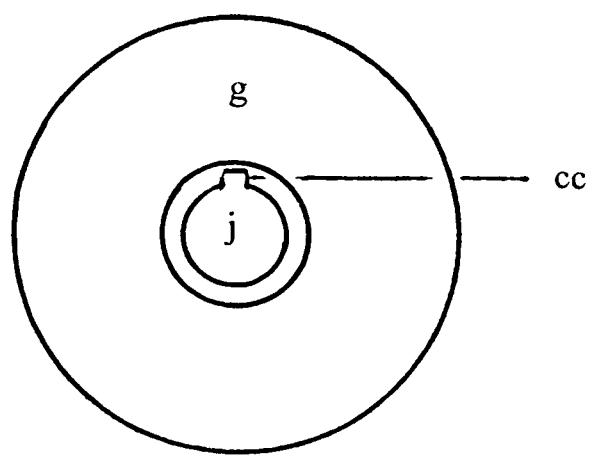
FIG. 12 is a front view of the parts shown in FIG. 11.

FIG. 12 shows a front view of pitch control ring with sleeve (g) drive shaft (j) and the slot (cc) in the pitch control ring with sleeve (g).

Figure 13:
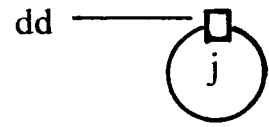
FIG. 13 is a front view of the key recessed into the drive shaft.

FIG. 13 shows the key (dd) recessed into a section of the drive shaft (j).

FIGS. 11, 12 and 13 show how the pitch control ring with sleeve (g) is allowed to move longitudinally while rotating with the drive shaft (j).

SYMBOLS USED IN DRAWING a air flow
b air scoop
c support
d reduction tunnel
e base
f hub
g pitch control ring with sleeve
h wind blade
i wind blade rod
j drive shaft
k governor control rod l bracket
m governor
n governor gear
o shaft drive gear
p alternator gear
q alternator
r wire to voltage regulator
s voltage regulator
t wire to main batteries
u moisture drain hole
v retainer ring
w cam
x return spring
y governor control rod wheel
z ball bearing ring
aa bushing
bb stop
cc slot
dd key
vpa variable pitch angle

The invention claimed is:

1. A method of driving an alternator or generator that provides supplemental charging to batteries of an electric powered vehicle to prolong the run time until the batteries need to be charged from an external source, the method comprising: directing air flow, created by the vehicle moving forward, via an air scoop through a reduction tunnel that is held in place by two or more supports, said air flow encountering and rotating one or more wind blades attached to rods that pass through a hub which contains cams and a return spring inside the hub; rotating said cams by a pitch control ring with sleeve mounted on a drive shaft that is rotated by the wind blades, wherein the pitch of the wind blades is changed by means of a governor control rod, governor control rod wheel, and said pitch control ring with sleeve; using said drive shaft to turn a governor by means of a gear meshing with a governor gear and also to turn another gear that drives an alternator or generator that generates electricity; and transferring said electricity through a voltage regulator to charge the batteries of the vehicle.

2. The method of claim 1, wherein the wind blade rpms are controlled by changing the pitch of the wind blades depending on the velocity of the air flow entering said air scoop, said velocity of the air flow depending on the forward speed of the vehicle.

\* \* \* \* \*